United States Patent [19]

Fujita et al.

[11] 4,178,270

[45] Dec. 11, 1979

[54] METHOD FOR SUPPORTING HYDROUS METAL OXIDE ON CARRIER

[75] Inventors: Kazunori Fujita, Tokaimura; Seiji Takeuchi, Hitachiota; Hisao Yamashita; Fumito Nakajima, both of Hitachi, all of Japan

[73] Assignee: Hitachi, Ltd., Japan

[21] Appl. No.: 882,334

[22] Filed: Feb. 1, 1978

[30] Foreign Application Priority Data

Mar. 1, 1977 [JP] Japan ................................. 52/20877

[51] Int. Cl.$^2$ ................................................ C02B 1/44
[52] U.S. Cl. ..................................... 252/447; 252/454; 252/462; 252/463; 252/471; 252/475; 210/38 B; 210/38 C
[58] Field of Search ............... 252/447, 454, 462, 463, 252/471, 475

[56] References Cited

U.S. PATENT DOCUMENTS

| | | | |
|---|---|---|---|
| 3,014,020 | 12/1961 | Balthis | 252/463 X |
| 3,652,458 | 3/1972 | Gobron et al. | 252/454 |
| 3,736,266 | 5/1973 | Schrage | 252/447 |
| 3,932,518 | 1/1976 | Arpe | 252/447 |

OTHER PUBLICATIONS

Vesely et al., "Synthetic Inorganic Ion Exchangers", Talanta Review, 19, pp. 219-222, Pergamon Press, N.Y., N.Y.

*Primary Examiner*—Patrick Garvin
*Attorney, Agent, or Firm*—Craig and Antonelli

[57] ABSTRACT

An inorganic ion-exchanger supported on a carrier suitable for recovery of useful resources in sea water, removal of impurities from high temperature boiler water in nuclear reactors or industrial boilers, removal of impurities in industrial waste water, etc. is prepared by supporting an active component of inorganic ion exchanger, such as hydrous oxide of metal, for example, titanium, zirconium, etc. on a porous carrier such as alumina, silica, or activated carbon, where a pH of a solution in contact with the active component and the carrier is adjusted so that the active component and the carrier can have zeta potentials of opposite polarities to each other, and an inorganic ion-exchanger having a larger amount of the supported active component and firmly supporting less bleedable active component can be obtained by setting out a supporting condition on the basis of the polarity of zeta potential.

10 Claims, 3 Drawing Figures

METHOD FOR SUPPORTING HYDROUS METAL OXIDE ON CARRIER

LIST OF PRIOR ART REFERENCES (37 CFR 1.56(a))

The following reference is cited to show the state of the art:

V. Vesely and V. Pekarek: Talanta Review 1972 19 219-222 Pergamon Press

This invention relates to a method for effectively and firmly supporting a hydrous metal oxide on a carrier having a good mechanical strength.

Heretofore, many inorganic ion-exchangers have been known, and V. Vesely and V. Pekarek make detailed discussion of the inorganic ion exchangers in Talanta Review, 1972 19 219-222, Pergamon Press, entitled "Synthetic Inorganic Ion-exchangers."

Hydrous oxides of metals such as titanium, zirconium, etc. (which will be hereinafter referred to as "hydrous metal oxide") are known as inorganic ion-exchangers, and have been regarded as desirable exchangers working in high temperature water, in which any organic ion exchange resin fails to work, or recently as a desirable microbial-fixing agent. These hydrous metal oxides are amphoteric ion exchangers, and can advance an anion or cation exchange reaction, depending upon pH of a solution. The hydrous metal oxide has such characteristics as described above, but it is said that its largest disadvantage is that it has a low mechanical strength.

When a small amount of hydrous metal oxide is used for chemical analysis, a hydrous metal oxide in a sol state is air-dried to a gel state, and the hydrous metal oxide in the gel state is employed after having been sieved to particles of a predetermined size thereof. However, even in such a case, it has been often experienced that the particles are further made finer in an aqueous solution by vigorous stirring, making separation of the solid particles from the aqueous solution very hard.

Furthermore, when the hydrous metal oxide is employed in a packed column, it is hard to prepare granules having a predetermined size from it, and even if such granules could be prepared, they could be made finer when contacted with an aqueous solution, and thus the granules would be substantially impossible to employ. That is, there have been so far no examples substantially of utilizing the inorganic ion-exchanger of hydrous metal oxide as the active component in an industrial scale.

Heat treatment has been proposed as a means for giving a strength to the hydrous metal oxide, but in that case the hydroxyl groups as an ion exchange group undergo condensation, thereby greatly lowering the ion exchange capacity of the exchanger. Thus, actually the heat treatment is not preferable.

A method for supporting a metal oxide on a carrier having a good mechanical strength is well known in the methods for preparing catalysts, where a carrier is dipped in a solution containing a metal salt, taken out of the solution, and calcined. Said disadvantages can be eliminated by supporting a hydrous metal oxide on a carrier similarly according to said method. For example, a carrier is sufficiently dipped in an aqueous solution containing a metal salt, and precipitates of a hydrous metal oxide can be supported on the carrier by hydrolysis or neutralization reaction in the aqueous solution. However, an amount of a hydrous metal oxide to be supported on a carrier greatly depends upon hydrolysis condition in said method, and even in the hydrous metal oxide is supported on the carrier, the resulting ion-exchanger has such a disadvantage that the hydrous metal oxide is bled out of the carrier when employed in an aqueous solution.

To remove radioactive cobalt dissolved as ionized in water in nuclear reactor, an organic ion exchange resin is employed. The organic ion exchange resin has a temperature restriction, and cannot directly treat the water in nuclear reactor at an elevated temperature. That is, a development of a highly heat-resistant inorganic ion-exchanger has been so far desired. As a method for preparing a heatresistant inorganic exchanger, it has been proposed to support a hydrous metal oxide on a carrier having a high mechanical strength, and calcine the carrier at an elevated temperature. However, in that case, the amount of the hydrous metal oxide to be supported on the carrier cannot reach the desired value, or the supported hydrous metal oxide is bled out of the carrier when calcined, and the ion exchange capacity of the resulting heat-resistant inorganic ion-exchanger is very unsatisfactory.

An object of the present invention is to provide a method for firmly supporting a hydrous metal oxide on a carrier.

Another object of the present invention is to provide a method for supporting a large amount of a hydrous metal oxide on a carrier.

Other object of the present invention is to provide a method for preparing an inorganic ion-exchanger suitable for recovery of useful metals in sea water, removal of ions in solution, and removal of impurities from water in nuclear reactor.

The present invention is characterized by supporting a hydrous metal oxide on a carrier under such a condition that the hydrous metal oxide and the carrier have zeta potentials of opposite polarities, and more particularly by contacting a carrier with a solution containing a metal salt capable of forming a hydrous metal oxide by hydrolysis, adjusting a solution to a pH range of making a zeta potential of resulting anhydrous metal oxide and that of the carrier have different polarities from each other, and conducting hydrolysis of the metal salt, thereby depositing the hydrous metal oxide resulting from the hydrolysis as such on the surface of the carrier, while establishing a strong bondage between the deposited hydrous metal oxide and the carrier. The inorganic ion exchanger thus prepared is useful for recovery of useful metals, especially uranium in sea water, and recovery of cobalt from water in nuclear reactor, and removal of heavy metal ions from industrial effluent water.

It has been clarified by the present inventors that an amount of hydrous metal oxide supported on a carrier depends upon hydrolysis conditions and this is in a close connection to a zeta potential of the carrier. When both the hydrous metal oxide and the carrier take zeta potentials of the same polarity, that is, negative or positive value in a solution at a constant pH, the hydrous metal oxide cannot be supported on the carrier, or even if the carrier can support the hydrous metal oxide, the hydrous metal oxide will be bled out of the carrier, when employed in an aqueous solution for a certain period of time.

Zeta potential of hydrous titanium oxide or hydrous zirconium oxide changes with pH of the solution, and also zeta potential of alumina, silica gel or other used as the carrier also changes with pH of the solution. For example, hydrous titanium oxide

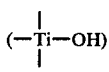

is dissociated at a low pH in the following manner, and the surface of the hydrous titanium oxide has a positive potential.

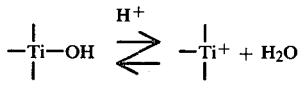

Thus, it seems that the zeta potential shows a positive value owing to the electric charge by said ionization, said zeta potential differs from the surface potential, but can serve as an index showing an electrically charged state of the surface of the hydrous metal oxide.

When both the hydrous metal oxide and the carrier have zeta potentials of same polarity, an electrically repulsive force is developed between these two, making them repulse each other. On the other hand, when they have zeta potentials of opposite polarities, an electrically attracting force is developed therebetween. When an aqueous solution containing both the hydrous metal oxide and the carrier is adjusted to such a pH that the hydrous metal oxide and the carrier can have zeta potentials of opposite polarities, the hydrous metal oxide can be deposited even in the pores of the carrier, and thus the amount of the hydrous metal oxide supported on the carrier is considerably increased. Furthermore, there is an electrical attraction on a boundary surface between the carrier and the deposited hydrous metal oxide, and consequently a strong bondage is established therebetween.

Zeta potential can be readily measured in various manners. For example, a measurement based on electrophoresis is widely employed as the ordinary method.

The amount of hydrous metal oxide supported on the carrier in the following Examples and Comparative Examples is measured by pulverizing an air-dried sample, fusing the pulverized sample by means of potassium bisulfate, thereby forming, for example, $TiOSO_4$ in the case of titanium, further forming a hydrogen peroxide complex of titanium by means of hydrogen peroxide, and measuring its absorbance.

Binding strength (degree of bleeding) between the hydrous metal oxide and the carrier is measured in the following manner: 200 ml of a solution having the pH as that for hydrolysis and 5 g of a sample of carrier supporting a hydrous metal oxide are placed in a conical flask having a capacity of 300 ml, and the conical flask is fixed onto a shaker and shaked at a reciprocating distance of 5 cm and 240 reciprocations per minute for 5 hours; then, the carrier is washed sufficiently with distilled water, and then dissolved in a strong acid, for example, nitric acid for the analysis of titanium; and the carrier components and the metal of the hydrous metal oxide are quantitatively analyzed to determine the amount of the hydrous metal oxide supported on the carrier after the shaking.

In the present invention, the hydrous metal oxide is specifically a metal oxide to which water molecules are bonded by hydrolysis. For example, it is known that hydrous zirconium oxide is represented by the general formula, $ZrO_2 \cdot nH_2O$, where n is mainly in a range of 1 to 2, hydrous titanium oxide by $TiO_2 \cdot 0.5\text{-}2H_2O$, hydrous iron oxide by $\gamma\cdot Fe_2O_3$ or $Fe_3O_4$ to which 1-2.5 water molecules are bonded.

According to the present invention, the carrier supports about 10% by weight of the hydrous metal oxide in the hydrolyzed state, on the basis of the carrier, and at least 5% by weight thereof, even after the shaking.

In carrying out the present invention, zeta potentials of hydrous metal oxide and carrier with changes in pH are measured individually in advance, and the carrier is dipped in an aqueous solution of metal salt capable of forming the hydrous metal oxide. Then, pH is adjusted so that the zeta potential of resulting hydrous metal oxide and that of the carrier can have opposite polarities on the basis of the zeta potentials measured in advance, and then the metal salt is hydrolyzed.

The hydrous metal oxides applicable to the present invention include hydrous oxides of metals employed in the ordinary ion-exchangers such as titanium and zirconium, and the carriers applicable to the present invention include silica gel, alumina, activated carbon, etc.

Hydrous oxide of such metal supported on alumina carrier as titanium, zirconium, or titanium and manganese, zinc, tin, zirconium, silicon, or rare earth element, is suitable as an adsorbent for recovering uranium from sea water.

An inorganic ion-exchanger for catching the impurities in water in nuclear reactor must be freed by force in advance from readily bleedable components to prevent the bleeding of the supported hydrous metal oxide. It is desirable to vigorously shake the carrier supporting the hydrous metal oxide in water in a pH range for effecting the hydrolysis of the metal salt.

An adsorbent for catching radioactive cobalt ions contained in the water in nuclear reactor at an elevated temperature is prepared by supporting a hydrous titanium oxide on an alumina carrier according to the present method, and then calcining the carrier at a temperature of 700° to 1,100°0 C. The calcination is carried out to prevent bleeding of the hydrous titanium oxide into hot water. In the calcined catching agent, rutile type titanium oxide is supported on $\gamma$ or $\psi$-type alumina, and 5 to 20% by weight of titanium oxide is supported on the alumina, on the basis of the alumina.

BRIEF DESCRIPTION OF THE DRAWINGS

In FIG. 1, zeta potentials of silica gel, alumina and activated carbon used as carriers, measured at various pH values, are shown, where A shows $\gamma$-alumina, B activated carbon, and C silica gel. As is evident from FIG. 1, the zeta potentials of silica gel ($SiO_2$ made by Fuji Davison K.K., Japan) and activated carbon (spherical granules made by Kureha Kagaku Kogyo K.K., Japan) show negative values in a pH range of 3 to 10. On the other hand, $\gamma$-alumina ($Al_2O_3$ made by Mizusawa Kagaku K.K., Japan) shows positive values at pH below 8, and negative values at pH above 8, and pH 8 is an isoelectric point. As shown in FIG. 1, the zeta potential at constant pH depends upon the kind of the carriers, and changes with pH of the solution.

In FIG. 2, zeta potentials of hydrate of titanium dioxide and hydrate of zirconium oxide used as the hydrous metal oxide with changes in pH are shown, where D represents the hydrate (1.5 hydrate) of zirconium oxide, E the hydrate of titanium dioxide (1.7 hydrate; titanium sulfate is used as raw material), and F likewise the hydrate of titanium oxide (dihydrate: titanium tetrachloride is used as raw material). As is evident from FIG. 2, zeta potential of the hydrous titanium oxide depends upon the kind of the raw material and conditions of formation, and it seems that this must be due to differences in the amount of formed dissociated groups, that is, hydroxyl groups, on the surface of the hydrous titanium oxide, that is, due to the amount of hydrates. This can be confirmed from a result of measurement of potassium ion exchange capacity at a predetermined pH.

In FIG. 3, relations between amounts of hydrous titanium oxide supported on $\gamma$-alumina (titanium tetrachloride is used as a raw material) and pH at hydrolysis are shown, where the amounts of hydrous titanium oxide is the values after shaking test.

Figure 1:
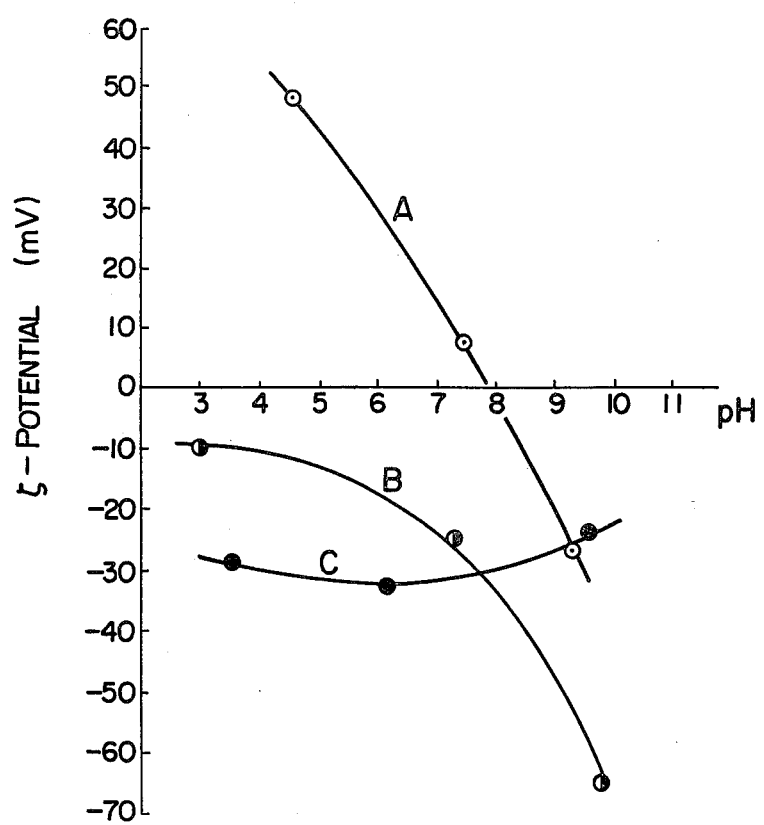
FIGS. 1 and 2 show that zeta potentials of hydrous metal oxides and carriers change with pH.
Figure 2:
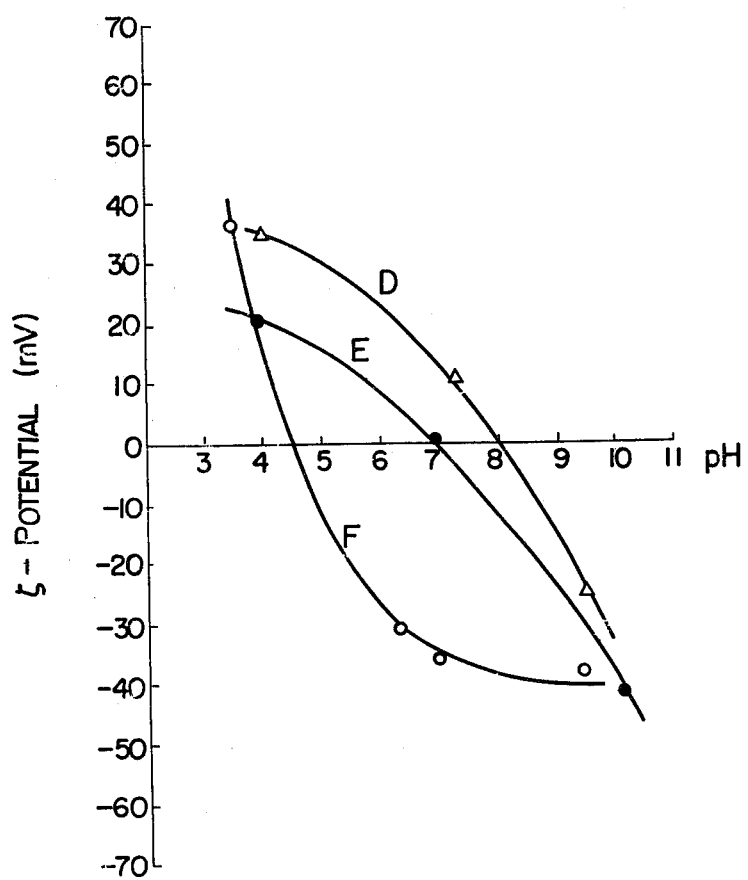

As is evident from FIGS. 1 and 2, both $\gamma$-alumina and hydrous titanium oxide show positive zeta potentials at a pH below 4.5, and negative zeta potentials at a pH above 8. It is also evident from FIG. 3, that a larger amount of the hydrous titanium oxide is supported on $\gamma$-alumina at a pH between 4.5 and 8 hydrolysis.

DESCRIPTION OF THE PREFERRED EMBODIMENTS

The present invention will be described in detail, referring to Examples, but will not be restricted thereto.

COMPARATIVE EXAMPLE 1

20 g of $\gamma$-alumina (made by Mizusawa Kagaku K.K., Japan) dried in air at 120° C. for 2 hours was admixed with 50 ml of a commercially available aqueous hydrochloric acid-acidified titanium tetrachloride solution, tightly sealed, and left stnading for 24 hours, thereby sufficiently impregnating the carrier with the titanium tetrachloride solution even to its inside. Then, the impregnated carrier was transferred into a beaker, brought in contact with 100 ml of water adjusted to pH 3.5 by hydrochloric acid, and then left standing for 24 hours, thereby hydrolyzing the titanium tetrachloride in the carrier. After completion of the reaction, the carrier was sufficiently washed with distilled water, and air dried.

EXAMPLE 1

The $\gamma$-alumina impregnated with titanium tetrachloride in the same amounts and the same manner as in Comparative Example 1 was brought in contact with water adjusted to pH 7 with aqua ammonia, left standing for 24 hours, thereby hydrolyzing titanium tetrachloride in the carrier, washed with distilled water, and airdried.

COMPARATIVE EXAMPLE 2

The $\gamma$-alumina impregnated with titanium tetrachloride in the same manner as in Comparative Example 1 was brought in contact with water adjusted to pH 10 with aqua ammonia, thereby hydrolyzing titanium tetrachloride in the carrier, washed with distilled water, and air-dried.

EXAMPLE 2

20 g of silica gel (made by Fuji Davison K.K., Japan) dried in air at 120° C. for two hours in advance as a carrier was admixed with 50 ml of a commercialy available aqueous titanium tetrachloride solution, tightly sealed and left standing for 24 hours, thereby sufficiently impregnating the carrier with titanium tetrachloride even to its inside. Then, the carrier was transferred into a beaker, brought in contact with water adjusted to pH 3.5 with hydrochloric acid, and left standing for 24 hours, thereby hydrolyzing titanium tetrachloride. After the completion of hydrolysis, the carrier was sufficiently washed with distilled water, and air-dried.

COMPARATIVE EXAMPLE 3

The silica gel pretreated in the same manner as in Example 2 was impregnated with titanium tetrachloride in the same manner as in Example 2, brought in contact with water adjusted to pH 7 with aqua ammonia, thereby hydrolyzing titanium tetrachloride, and washed with distilled water, and air-dried.

COMPARATIVE EXAMPLE 4

20 g of the $\gamma$-alumina pretreated in the same manner as in Comparative Example 1 as a carrier was brought in contact with 100 ml of a hydrochloric acid solution containing 4.6 g of zirconium tetrachloride, and left standing for 24 hours, thereby sufficiently impregnating the carrier with zirconium tetrachloride. Then, the carrier was brought in contact with water adjusted to pH 5.5 with hydrochloric acid, left standing for 24 hours, thereby hydrolyzing zirconium tetrachloride, washed with distilled water, and air-dried.

EXAMPLE 3

20 g of the silica gel pretreated in the same manner as in Example 2 as a carrier was brought in contact with 100 ml of a hydrochloric acid solution containing 4.6 g of zirconium tetrachloride, and left standing for 24 hours, thereby sufficiently impregnating the carrier with zirconium tetrachloride. Then, the carrier was brought in contact with water adjusted to pH 5.5 with hydrochloric acid, left standing for 24 hours, thereby hydrolyzing zirconium tetrachloride, washed with distilled water, and then air-dried.

COMPARATIVE EXAMPLE 5

20 g of activated carbon not pretreated (dried) as a carrier was brought in contact with 50 ml of a commercial available aqueous titanium tetrachloride solution, tightly sealed, and left standing for 24 hours, thereby sufficiently impregnating the carrier with the titanium tetrachloride solution. Then, the carrier was transferred into a beaker, brought in contact with 100 ml of water adjusted to pH 9 with aqua ammonia, and left standing for 24 hours, thereby hydrolyzing titanium tetrachloride. Then, the carrier was sufficiently washed with distilled water, and air-dried.

EXAMPLE 4

The activated carbon as the carrier was impregnated with titanium tetrachloride in the same manner as in Comparative Example 5, and the impregnated carrier was brought in contact with water adjusted to pH 4 with hydrochloric acid, thereby hydrolyzing titanium tetrachloride, washed with distilled water, and air-dried.

The amounts of the hydrous metal oxides supported on the carriers and bled out of the carriers, and the residual amount of the hydrous metal oxides on the carriers as given in the foregoing Examples and Comparative Examples are given in the following Table 1. As in evident from Table 1, the hydrous metal oxides are effectively supported on the carriers with less bleeding by electrical attraction when both the hydrous metal oxides and the carriers have zeta potentials of opposite polarities to each other. Though the zeta potentials of these two have the same polarity, a large amount of the hydrous metal oxide can be deposited but finally the amount of the hydrous metal oxide supported on the carrier is lowered due to its bleeding out of the carrier.

washed with distilled water, and air-dried. The amount of the hydrous titanium oxide after the hydrolysis at pH 7 was 118 mg/g.γ-alumina and the amount of the oxide bled and the residual amount of the oxide after the shaking test for 5 hours were 20.6 mg/g.γ-alumina and 97.4 mg/g.γ-alumina, respectively.

EXAMPLE 7

The γ-alumina as a carrier was impregnated with titanium tetrachloride and subjected to hydrolysis at pH 7 in the same manner as in Example 1, and then dipped in water adjusted to pH 3.6 with hydrochloric acid and subjected to shaking test therein for 5 hours. After the completion of the shaking test, the carrier was sufficiently washed with distilled water, and airdried. The amount of the oxide bled after the shaking test for 5 hours was 32 mg/g.γ-alumina.

Table 1

| | Carrier (A) | Hydrous metal oxide (B) | pH at hydrolysis | Zeta potential polarity (A) — (B) | | Amount supported $\frac{mg (B)}{g (A)}$ | Amount bled $\frac{mg (B)}{g (A)}$ | Residual amount after bleeding $\frac{mg (B)}{g (A)}$ |
|---|---|---|---|---|---|---|---|---|
| Comp. Ex. 1 | γ-alumina | titanium | 3.5 | + | + | 44 | 32 | 12 |
| Example 1 | γ-alumina | titanium | 7 | + | − | 127 | 10 | 117 |
| Comp. Ex. 2 | γ-alumina | titanium | 10 | − | − | 94 | 75 | 19 |
| Example 2 | Silica gel | titanium | 3.5 | − | + | 94 | 13 | 81 |
| Comp. Ex. 3 | Silica gel | titanium | 7 | − | − | 22 | 14 | 8 |
| Comp. Ex. 4 | γ-alumina | Zirconium | 5.5 | + | + | 21 | 13 | 8 |
| Example 3 | Silica gel | Zirconium | 5.5 | − | + | 95 | 20 | 75 |
| Comp. Ex. 5 | Activated carbon | titanium | 9 | − | − | 90 | 64 | 26 |
| Example 4 | Activated carbon | titanium | 4 | − | + | 110 | 23 | 87 |

EXAMPLE 5

Figure 3:
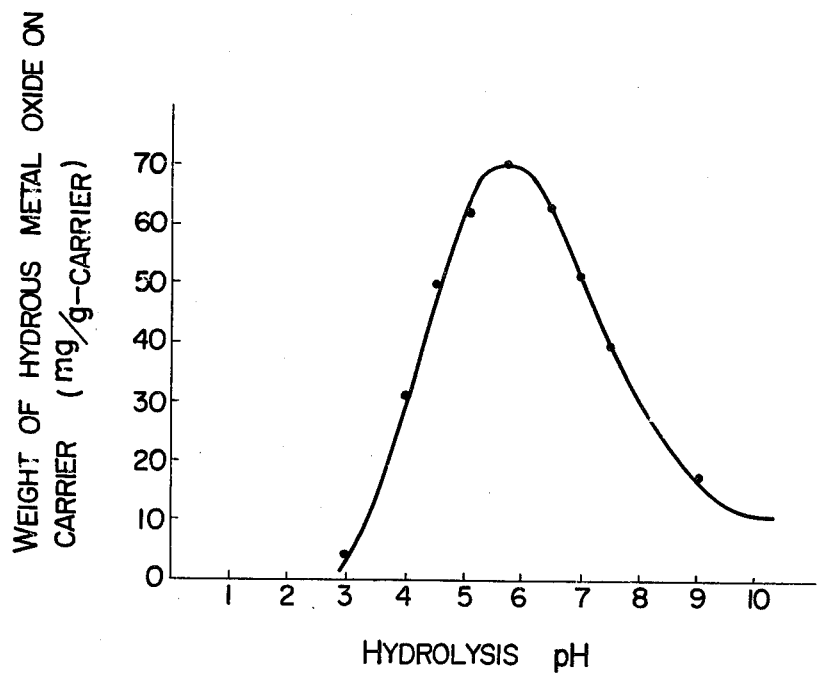
FIG. 3 shows relations between amount of hydrous titanium oxide on $\gamma$-alumina and pH at hydrolysis.

20 g of activated carbon as a carrier was impregnated with an aqueous 4.6% zirconium tetrachloride solution, and then dipped in water adjusted to pH 3 to 10 with sulfuric acid or caustic soda, thereby hydrolyzing zirconium tetrachloride. Then, the carrier was washed with distilled water, left standing in a room for one week, then subjected to shaking test in the solutions of the same pH as at the hydrolysis to measure amounts of hydrous zirconium oxide supported on the carrier after the shaking test. Results are shown in FIG. 3. The activated carbon had a negative zeta potential in a pH range of 3 to 10, whereas the hydrous zirconium oxide had a negative zeta potential at a pH above 8, and a positive zeta potential at a pH below 8. Thus, the polarities of zeta potentials of the carrier and the hydrous zirconium oxide supported thereon were opposite to each other at a pH below 8, and an increased amount of the hydrous zirconium oxide could be supported on the carrier. When the pH was below 5, the hydrolysis rate of zirconium tetrachloride was made lower or the hydrolyzed compound was again dissolved in the acid, whereby the amount of the hydrous zirconium oxide was lowered. At a pH below 3.5, the hydrous zirconium oxide was not supported substantially at all.

EXAMPLE 6

The γ-alumina as a carrier was impregnated with titanium tetrachloride and subjected to hydrolysis at pH 7 in the same manner as in Example 1, and then dipped in water adjusted to pH 10.6 with aqua ammonia and subjected to shaking test therein for 5 hours. After the completion of the test, the carrier was sufficiently As is evident from the results of Examples 6 and 7, the hydrous metal oxide once supported is hardly bleedable from the carrier, even if the hydrous metal oxide is supported on the carrier in the pH range where the zeta potentials of these two have opposite polarities to each other, and then the carrier is transferred to the pH range where the polarities of the zeta potentials are changed. This seems to be due to a chemical bondage existing between the groups on the surface of γ-alumina and the hydrous metal oxide.

EXAMPLE 8

0.5 g each of the titanium-alumina inorganic ion-exchanger prepared in Example 1 and the zirconiumalumina inorganic ion-exchanger prepared in Example 3 were added to 500 ml each of individual solutions containing 30 ppm cobalt and pH 5.75, and left standing at various temperatures, for 8 hours, and then cobalt concentrations of the individual solutions were measured by atomic absorption analysis to determine adsorption capacities for cobalt. The results are shown in Table 2. The former ion-exchanger had a hydrous titanium oxide (supported) content of 117 mg/g-carrier, and the latter had a hydrous zirconium oxide (supported) content of 75 mg/g-carrier.

Table 2

| Temperature | Titanium-alumina | | Zirconium-alumina | |
|---|---|---|---|---|
| 30° C. | 0.25 | m mol/g-exchanger | 0.14 | m mol/g-exchanger |
| 50° C. | 0.32 | " | 0.20 | " |
| 75° C. | 0.39 | " | 0.28 | " |
| 92° C. | 0.49 | " | 0.38 | " |

It is seen from Table 2 that the adsorption capacities for cobalt of the hydrous titanium and zirconium oxides are increased with increasing temperature.

EXAMPLE 9

Inorganic ion-exchangers of hydrous titanium oxide supported on alumina carriers prepared under the same conditions as in Example 1 were calcined individually at 600°, 740°, 840° and 1050° C. in air for 5 hours to obtain calcined inorganic ion-exchangers. One gram each of the calcined inorganic ion-exchangers were placed individually in cylindrical columns, and pressurized water at 150° C. was passed through the cylindrical columns. Bleeding of titanium was not detected at all in the effluent water from the ion-exchangers calcined at 600°–1050° C.

Then, sample water being adjusted to pH 4.1 with hydrochloric acid and containing 3 ppm cobalt was passed through the cylindrical columns at a column inlet temperature of 150° C. for 7 hours. After the passage, the inorganic ion-exchangers were melted with potassium pyrosulfate and cobalt (caught) contents were measured by atomic absorption analysis after dissolution of the melt in dilute sulfuric acid. Results are given in Table 3.

Table 3

| Calcination temperature °C. | Co (caught) content (m mol/g-exchanger) | Percent Co Catching (%) |
| --- | --- | --- |
| 600 | 0.10 | 61 |
| 740 | 0.15 | 92 |
| 840 | 0.13 | 80 |
| 1050 | 0.11 | 67 |

Alumina carrier supporting no hydrous titanium oxide was calcined at 740° C., and said sample water containing cobalt was passed through the carrier layer, where 0.02 m mol of cobalt was caught per g-exchanger. It is seen from the foregoing that titanium takes part in catching the cobalt. The titanium oxide calcined at the elevated temperature can have a Co ions-catching capacity, because it seems that rehydration of titanium oxide takes place in water at the elevated temperature and the cobalt ions are caught by ion exchange with hydroxy group on the surface thereof.

EXAMPLE 10

Uranium recovery test was carried out by dissolving 10 ppb uranium in sea water. Inorganic ion-exchanger No. 1 was prepared according to Example 1, No. 2 according to Example 2, No. 3 according to Example 3, No. 4 according to Example 4, and No. 5 according to Comparative Example 1.

One gram each of the inorganic ion-exchangers were placed into 1 l of sea water individually, and stirred for 8 hours. After removal of the inorganic ion-exchangers, uranium concentration of the sea water was measured by colorimetry using arsenazo (III) as a color-developing reagent to determine the amount of uranium caught by one gram of the individual inorganic ion-exchangers. Results are shown in Table 4.

Table 4

| Ion-exchanger | Carrier | Hydrous metal oxide | Residual hydrous metal oxide after bleeding mg/g-carrier | Amount of uranium caught $\mu g U/$ g/exchanger |
| --- | --- | --- | --- | --- |
| No. 1 | γ-alumina | titanium | 105 | 45 |
| 2 | silica gel | titanium | 83 | 42 |
| 3 | silica gel | zirconium | 74 | 40 |
| 4 | activated carbon | titanium | 89 | 42 |
| 5 | γ-alumina | titanium | 18 | 6 |

What is claimed is:

1. A method for supporting a hydrous metal oxide on a carrier, which comprises hydrolyzing a metal salt near a surface of carrier in a pH range causing hydrolysis of the metal salt and allowing zeta potentials of the carrier and hydrous oxide of metal to have opposite polarities to each other.

2. A method for supporting a hydrous metal oxide on a carrier, which comprises impregnating a porous carrier with a solution containing a metal salt capable of forming a hydrous metal oxide by hydrolysis, and bringing the porous carrier impregnated with the solution to a pH range causing hydrolysis of the metal salt and allowing zeta potentials of the porous carrier and the hydrous oxide of metal to have opposite polarities to each other.

3. A method according to claim 1 or 2, wherein the hydrous oxide of metal is at least one of hydrous titanium and zirconium oxides.

4. A method according to claim 1 or 2, wherein the carrier is one of alumina, silica and activated carbon.

5. A method for supporting a hydrous metal oxide on a carrier in inorganic ion-exchangers for purifying water in nuclear water, which comprises impregnating a porous carrier with a solution containing a metal salt capable of forming a hydrous metal oxide by hydrolysis, bringing the porous carrier impregnated with the solution to a pH range causing hydrolysis of the metal salt and allowing zeta potentials of the porous carrier and the hydrous metal oxide to have opposite polarities to each other, supporting the hydrous metal oxide on the porous carrier by the hydrolysis of the metal salt and shaking the porous carrier supporting the hydrous metal oxide in a solution in a pH range causing the hydrolysis of the metal salt, thereby removing bleedable hydrous metal oxide from the carrier.

6. A method for supporting a hydrous metal oxide on a carrier in preparing inorganic ion-exchangers for purification of water in nuclear reactor, which comprises impregnating a porous carrier with a solution containing a metal salt capable of forming a hydrous metal oxide by hydrolysis, bringing the porous carrier impregnated with the solution to a pH range causing hydrolysis of the metal salt and allowing zeta potentials of the porous carrier and the hydrous metal oxide to have opposite polarities to each other, supporting the hydrous metal oxide on the porous carrier by the hydrolysis of the metal salt, then shaking the porous carrier impregnated with the hydrous metal oxide in a solution in a pH range causing the hydrolysis of the metal salt, thereby removing bleedable hydrous metal oxide from the carrier, and calcining the carrier at a temperature of 700° to 1,100° C.

7. A method according to claim 5 or 6, wherein the porous carrier is one of alumina, silica and activated carbon, and the hydrous metal oxide is at least one of hydrous titanium and zirconium oxides.

8. A method for supporting a hydrous metal oxide on a carrier in preparing inorganic ion-exchangers for recovery of uranium from sea water, which comprises impregnating a porous carrier with a solution containing a metal salt capable of forming a hydrous metal oxide by hydrolysis, maintaining the porous carrier impregnated with the solution in a pH range causing hydrolysis of the metal salt and allowing zeta potentials of the porous carrier and the hydrous metal oxide to have opposite polarities to each other, and thereby hydrolyzing the metal salt, thereby supporting the hydrous metal oxide on the porous carrier.

9. A method according to claim 8, wherein the hydrous metal oxide is a hydrous oxide of titanium, and mixtures of titanium with at least one of manganese, zinc, tin, zirconium, silicon, and rare earth elements 10. A method for supporting at least 5% by weight of a hydrous metal oxide on a carrier on the basis of carrier, which comprises measuring zeta potentials of a hydrous metal oxide and a porous carrier individually with changing pH in advance, thereby setting pH values forming the hydrous metal oxide and showing opposite polarities of zeta potentials of the hydrous metal oxide and the porous carrier to each other, mixing a solution forming the hydrous metal oxide by hydrolysis with the porous carrier, adjusting the solution of the resulting mixture to said set pH values, thereby depositing the hydrous metal oxide on the porous carrier, and shaking the porous carrier deposited with the hydrous metal oxide in a solution at pH forming the hydrous metal oxide, thereby removing bleedable hydrous metal oxide from the porous carrier.

* * * * *